United States Patent [19]
Castoe

[11] 3,840,211
[45] Oct. 8, 1974

[54] VEHICLE WHEEL CAMBER AND CASTER ADJUSTMENT TOOL

[76] Inventor: John H. Castoe, 10234 McVine St., Sunland, Calif. 91040

[22] Filed: Nov. 2, 1973

[21] Appl. No.: 412,324

[52] U.S. Cl. ............................................. 254/131
[51] Int. Cl. ............................................. B66f 15/00
[58] Field of Search......... 81/3 R, 177 UJ; 254/131; 29/267

[56] References Cited
UNITED STATES PATENTS
3,286,988  11/1966  Dufaur............................. 254/131
3,537,685  11/1970  Gregory........................... 254/131

Primary Examiner—Al Lawrence Smith
Assistant Examiner—Roscoe V. Parker
Attorney, Agent, or Firm—Christie, Parker & Hale

[57] ABSTRACT

A vehicle wheel camber and caster adjustment tool includes a hook for engaging an adjustable inner shaft of the wheel assembly. The hook member is secured to a block to pivot relative to the block and about a substantially horizontal axis. The block is secured to an upright indexing pin which fits in a recess in the vehicle. The block is rotatable about an upright axis relative to the indexing pin. An elongated handle extends away from the indexing pin to provide leverage through the block and hook to the shaft to be adjusted. The angle of the handle relative to the indexing pin makes it easy to slip the tool under the fender of an automobile without having to remove an access panel or any of the normal accessories such as air conditioning hoses, smog devices, and the like. The handle is rotatable relative to the hook about a vertical axis and the horizontal axis so that the handle can be moved either forward or aft of the tire on the vehicle wheel to facilitate the adjustment of either the forward or the rear end of the adjustable shaft.

7 Claims, 6 Drawing Figures

PATENTED OCT 8 1974 3,840,211

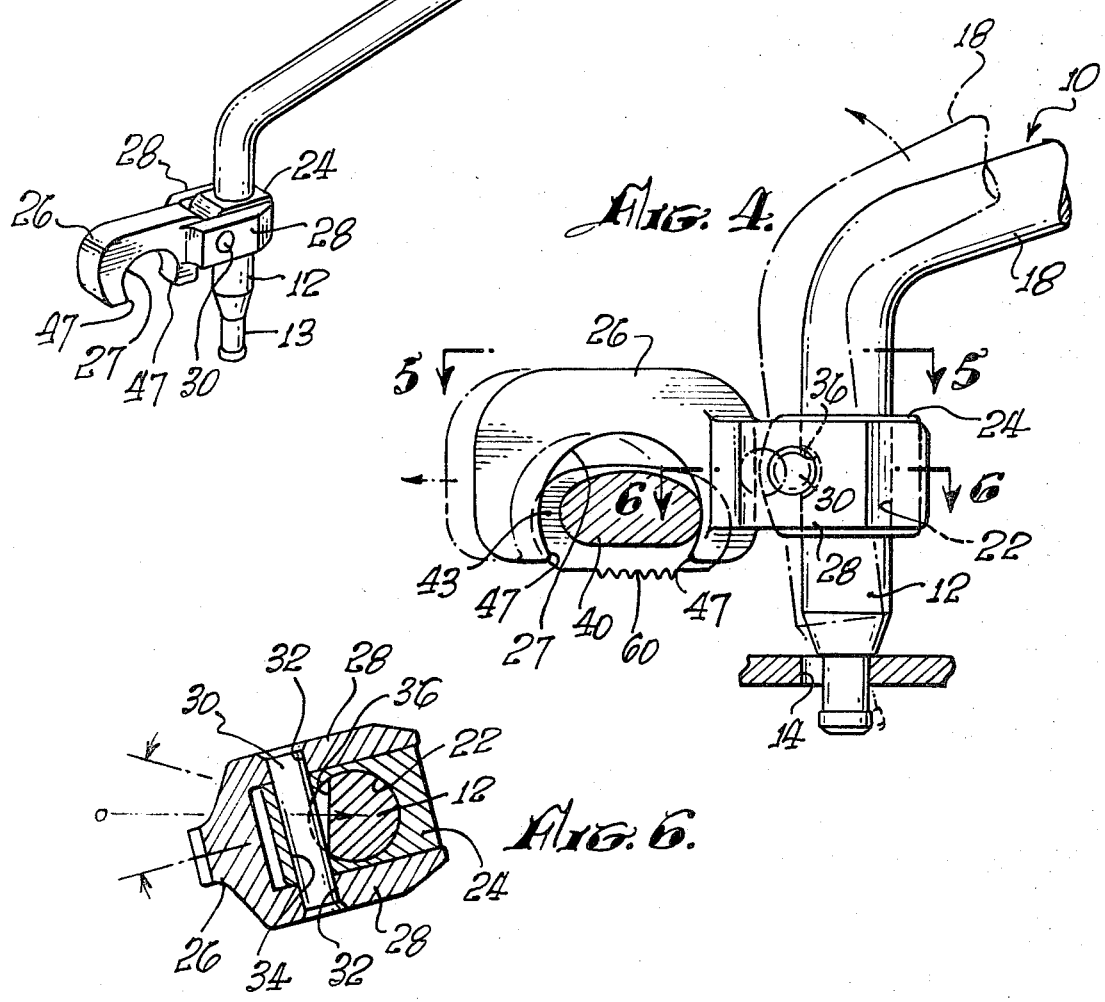

VEHICLE WHEEL CAMBER AND CASTER ADJUSTMENT TOOL

BACKGROUND OF THE INVENTION

This invention relates to a tool for adjusting the camber and the caster of the front wheels of certain vehicles having independently sprung front wheels.

Caster and camber adjustment of a typical automobile wheel is made by adjusting the position of a horizontal and longitudinally extending control shaft, which carries a U-shaped upper control arm secured at its ends to opposite ends of the control shaft. Separate vertical bolts extend down through the shaft at longitudinally spaced locations, and down through laterally extending slots in the automobile frame. Locking nuts on the upper end of the bolts clamp the shaft firmly against the frame so that the upper control arm is held in the proper position to provide the desired camber and caster for the wheel. Moving one end of the control shaft inwardly or outwardly with respect to the other end adjusts the caster of the wheel, and moving both ends of the control shaft outwardly or inwardly together adjusts the camber of the wheel.

For certain types of vehicles, camber and caster adjustment requires removal of an access panel overlying the wheel mounting assembly. It is also often necessary to remove accessory equipment, such as, the water bottle for the windshield wipers. Even after the access panel and water bottle are removed, the access opening is often spanned by hydraulic hoses, wires, and the like, preventing easy access to the lock nuts on the bolts which secure the control shaft to the vehicle frame.

This invention provides a tool which can be used under the fender of the vehicle to avoid having to remove the access panel and any accessories which might be in the way of the panel. This substantially reduces the time required to adjust the camber and caster of the wheel.

SUMMARY OF THE INVENTION

The tool of this invention includes an upright indexing pin having a lower end adapted to fit into a recess in a portion of the car from adjacent the end of a control shaft. An elongated shank is secured at its inner end to the upper end of the indexing pin, and extends outwardly away from the upright axis of the pin. A block is secured to the pin to be rotatable relative to the pin about an upright axis, and a hook is secured to the block to be rotatable relative to the block about an axis transverse to the upright axis about which the block is rotatable.

Preferably, the hook opens downwardly and has inwardly extending opposed jaws which fit underneath the control shaft to lift it slightly as it is adjusted. The shank or handle of the tool can pivot with respect to the hook about an upright axis to be positioned either forward or aft of the tire mounted on the wheel being adjusted, depending on which end of the shaft is being moved. The tool handle also can pivot relative to the hook about a horizontal axis to facilitate fitting of the hook on the shaft and fitting of the lower end of the indexing pin into the recess adjacent the end of the shaft being adjusted.

In the preferred form of the tool, a horizontal retaining pin extends through the block, the hook, and a groove in the indexing pin to connect those elements together. The shank extends away from the upper end of the indexing pin at an angle between about 0° and about 50° with respect to horizontal. A handle on the outer end of the shank extends upwardly at an angle greater than the angle made by the shank with the horizontal.

DESCRIPTION OF THE DRAWINGS

The invention will be more fully understood from the following description and the accompanying drawings, in which:

FIG. 3 is a perspective view of the preferred embodiment of the tool of this invention;

FIG. 4 is a fragmentary side elevation of the working end of the tool;

FIG. 5 is a view taken on line 5—5 of FIG. 4 with the shank in the center position with respect to the hook;

FIG. 6 is a view taken on line 6—6 of FIG. 4 with the shank and indexing pin turned about 20° in a clockwise (as viewed in FIG. 6) direction from the center position shown in FIG. 5.

DESCRIPTION OF THE PREFERRED EMBODIMENT

Figure 1:
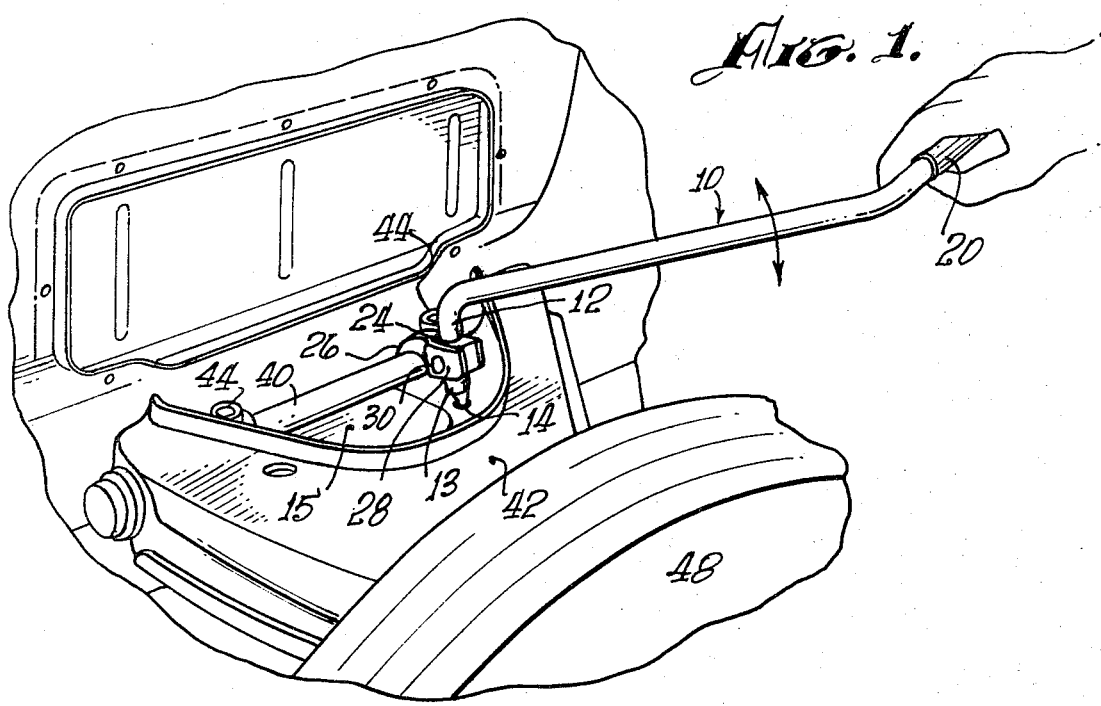
FIG. 1 is a perspective view of the camber and caster adjusting tool of this invention in operative position to adjust the position of an end of an inner control shaft on a wheel assembly.
Figure 2:
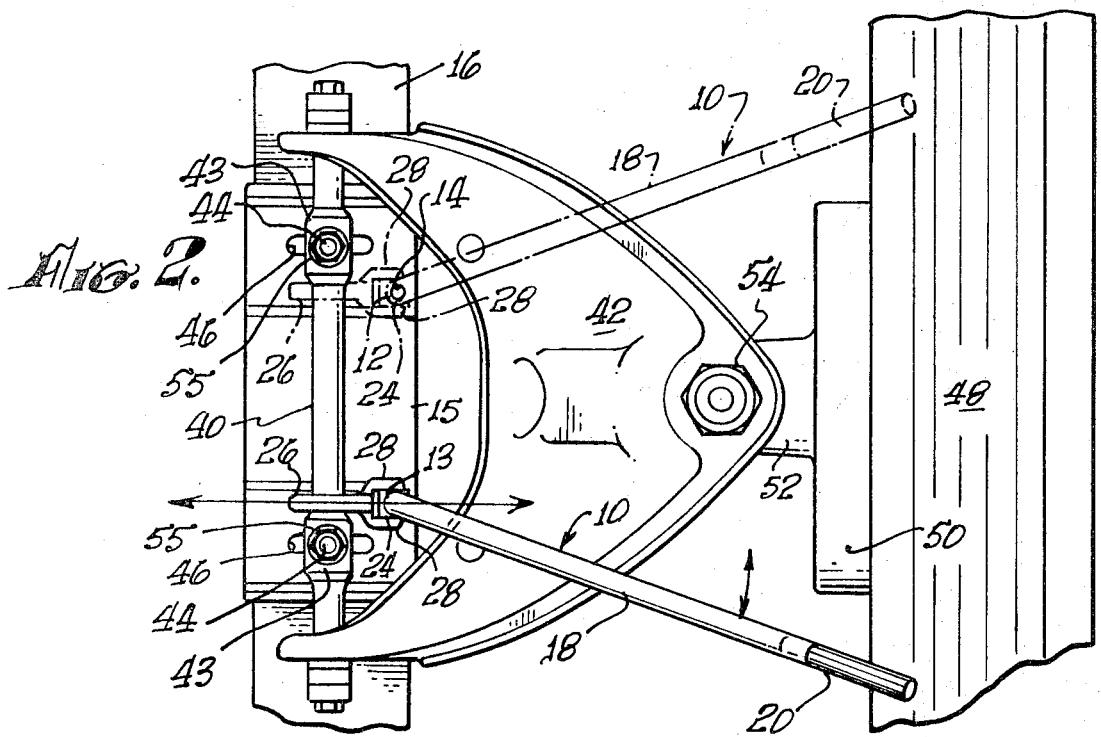
FIG. 2 is a top schematic view of two of the tools, with each tool in an operative position at a respective end of the inner control shaft of the wheel assembly.

Referring to the drawings, the tool 10 of this invention includes an upright indexing pin 12 with a lower end 13 adapted to fit into a recess 14 (FIG. 4) in a mounting plate 15 secured to the frame 16 of a vehicle (not shown).

An elongated, upwardly and outwardly extending shank 18 has its lower end formed integrally with the upper end of the indexing pin. The angle between the longitudinal axis of the indexing pin and the longitudinal axis of the shank is about 100°. This angle can vary from between about 85° to about 140°, depending on the arrangement of the wheel assembly and fender of the vehicle on which the work is done. A handle 20 is formed integrally on the outer end of the shank, and extends upwardly and outwardly away from the indexing pin at an angle of about 150° with respect to the longitudinal axis of the shank.

The indexing pin extends down through a vertical bore 22 (FIGS. 5 and 6) in a block 24. A hook 26 with a downwardly opening recess 27 has a pair of spaced ears 28 formed integrally on one side of the hook. Each ear lies in a respective vertical plane, and makes a close fit against a respective face of the block 24. The ears, block, and indexing pin are all secured together by a horizontal retaining pin 30 press-fitted through a pair of collinear bores 32 in the ear, a horizontal bore 34 in the block, and a semi-circular horizontal groove 36 in the portion of the indexing pin facing the hook. The retaining pin is spaced a slight distance from the bottom of the semi-circular groove in the indexing pin when the shank and hook are in the center position (FIG. 5) with respect to each other, i.e., the hook and the shank lie in a common plane. The retaining pin prevents the block from sliding longitudinally on the indexing pin, and limits the rotation of the shank and indexing pin with respect to the block to about 20° from each side of center, as shown in FIG. 6.

The tool is used to adjust the position of an inner control shaft 40, which has mounted at its ends a U-shaped upper control arm 42. The inner control shaft is secured to the mounting plate by two separate bolts 44 which each pass down through a respective bore (not shown) in a thickened portion 43 of the inner control shaft adjacent a respective end of the shaft. Each bolt 44 also extends down through a separate respective transverse elongated slot 46 formed in the mounting plate. The inner control shaft is elliptical in cross section, as shown best in FIG. 4.

The hook of the tool is worked into position over the inner control shaft adjacent the bolt which secures the end of the shaft to be adjusted. Inwardly extending and opposed jaws 47 (FIG. 4) on opposite sides of the recess in the hook fit under the control shaft. The indexing pin is fitted down into the adjacent recess 14, and the shank of the tool is moved either forward or rearward to clear the tire 48 on the wheel 50 secured by a spindle 52 to a ball joint 54 at the outer end of the upper control arm.

The lock nut 55 on the bolt at the end of the inner control shaft to be adjusted is loosened. The tension on the lock nut 55 on the bolt at the other end of the shaft is reduced just enough to permit the shaft to rotate about the axis of the bolt, but not enough to permit the inner control shaft to move laterally. The respective under surface of each thickened portion of the inner control shaft includes serrations 60 (FIG. 4) which tend to bite into the mounting plate 15 and prevent the inner control shaft from sliding laterally, even though the securing bolt is loosened enough to permit the shaft to rotate about the axis of the bolt.

The tool is operated by moving the handle up or down so that the desired end of the inner control shaft is moved laterally inwardly or outwardly to adjust the caster of the wheel. When the inner control shaft is in the desired position, the securing bolt 44 is tightened while the shaft is held in the desired position with the tool. The process is repeated as required at the other end of the shaft until the desired camber and caster are obtained for the wheel.

The advantages of the present tool are that the adjustment of the shaft is obtained with a single tool, which can be used under the vehicle fender without requiring removal of an access plate. Moreover, the tool does not have to pass through hoses or wiring mounted on the car. Another advantage of the tool is that the opposing jaws on the hook fit under the inner control shaft, and tend to lift it as it is moved laterally. This minimizes wear and scuffing of the serrations on the under side of the inner control shaft so that the serrations remain sharp and prevent the shaft from moving from the desired position once an adjustment is made.

Since the handle and shank of the tool can be moved with respect to the hook in about a vertical axis, and a horizontal axis, it is a simple matter to fit the tool under the fender and make an adjustment quickly since it is not necessary to remove an access panel or operate through accessories such as hydraulic hoses, smog control devices, and the like. Even more important, it is not necessary to remove any accessories to permit the tool of this invention to be used. Accordingly, using the tool of this invention permits camber and caster adjustments to be made quickly, easily, accurately, and with less labor.

I claim:

1. A tool for adjusting the camber and caster of a wheel assembly, the tool comprising:
    an upright indexing pin having a lower end adapted to fit into a recess in a first portion of the wheel assembly;
    an elongated shank secured at its inner end to the upper end of the indexing pin, and extending away from the upright axis of the pin;
    a block secured to the pin to be rotatable relative to the pin about an upright axis; and
    a hook secured to the block to be rotatable relative to the block about an axis transverse to the said upright axis.

2. A tool according to claim 1 in which the hook opens downwardly.

3. A tool according to claim 2 in which the hook includes a downwardly opening recess with inwardly extending jaws on opposite sides of the recess.

4. A tool according to claim 1 which includes a horizontal retaining pin extending through the block and the hook to permit the block and hook to be pivotal with respect to each other about the axis of the retaining pin.

5. A tool according to claim 4 in which the retaining pin also extends through an arcuate recess in a portion of the indexing pin facing the hook to limit the longitudinal movement of the block on the indexing pin, and to limit the rotation of the block about the indexing pin.

6. A tool according to claim 1 in which the longitudinal axis of the shank and the longitudinal axis of the indexing pin are at an angle with respect to each other between about 85° and about 140°.

7. A tool according to claim 6 which includes a handle on the other end of the shank, the handle extending upwardly so that the longitudinal axis of the handle and the longitudinal axis of the shank form an angle of about 150°.

* * * * *